United States Patent
Kumamoto et al.

(10) Patent No.: US 10,809,569 B2
(45) Date of Patent: *Oct. 20, 2020

(54) VIDEO DISPLAY DEVICE

(71) Applicant: Panasonic Intellectual Property Management Co., Ltd., Osaka (JP)

(72) Inventors: Yasuhiro Kumamoto, Osaka (JP); Takeichi Shinya, Osaka (JP); Koujirou Higa, Osaka (JP); Masaaki Ofuji, Osaka (JP); Taizou Takeuchi, Osaka (JP); Tadahiro Kugimaru, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/750,874

(22) PCT Filed: Aug. 30, 2016

(86) PCT No.: PCT/JP2016/003941
§ 371 (c)(1),
(2) Date: Feb. 7, 2018

(87) PCT Pub. No.: WO2017/038082
PCT Pub. Date: Mar. 9, 2017

(65) Prior Publication Data
US 2018/0239195 A1    Aug. 23, 2018

(30) Foreign Application Priority Data

Sep. 1, 2015 (JP) ................................ 2015-172363
Mar. 10, 2016 (JP) ................................ 2016-047554

(51) Int. Cl.
*G02F 1/13357* (2006.01)
*F21S 2/00* (2016.01)
(Continued)

(52) U.S. Cl.
CPC .......... *G02F 1/133608* (2013.01); *F21S 2/00* (2013.01); *F21V 7/00* (2013.01);
(Continued)

(58) Field of Classification Search
CPC ......... G09G 3/3611; G09G 2320/0626; H05B 33/0845; G02F 1/133308; G02F 1/13306;
(Continued)

(56) References Cited

U.S. PATENT DOCUMENTS

| 6,362,801 B1 | 3/2002 | Yuhara |
| 2003/0072153 A1 | 4/2003 | Matsui et al. |

(Continued)

FOREIGN PATENT DOCUMENTS

| EP | 2090924 A2 | 8/2009 |
| EP | 2184634 A2 | 5/2010 |

(Continued)

OTHER PUBLICATIONS

The Extended European Search Report dated Jun. 19, 2018 for the related European Patent Application No. 16841114.8.
(Continued)

*Primary Examiner* — Kent W Chang
*Assistant Examiner* — Andrew Lee
(74) *Attorney, Agent, or Firm* — McDermott Will & Emery LLP

(57) ABSTRACT

A video display device includes: a display panel that displays an image based on an input image signal; a light source substrate that includes a plurality of light sources on a main surface which is a front side of the light source substrate, and emits, toward a rear side of the display panel, light emitted from the plurality of light sources; a reflection sheet that is provided on the main surface of the light source substrate, and in which hollow partitioning walls each of which separates adjacent two light sources of the plurality of light
(Continued)

sources are formed; an optical member that is provided between the display panel and the light source substrate, and uniformizes luminance distribution of the light emitted from the light source substrate; and support members each of which is provided between the light source substrate and the optical member, and supports the optical member. The reflection sheet includes intersection portions where the partitioning walls formed in a first direction and the partitioning walls formed in a second direction crossing the first direction cross each other, and further includes linear portions formed in parallel with the first direction or the second direction. Each of the support members is disposed in a recess portion formed in a corresponding linear portion.

8 Claims, 12 Drawing Sheets

(51) Int. Cl.
G09F 9/00 (2006.01)
F21V 7/00 (2006.01)
G09G 3/34 (2006.01)

(52) U.S. Cl.
CPC .. *G02F 1/133603* (2013.01); *G02F 1/133605* (2013.01); *G09F 9/00* (2013.01); *G09G 3/3426* (2013.01); *G02F 1/133606* (2013.01)

(58) Field of Classification Search
CPC ......... G02F 1/133605; G02F 1/133603; G02F 2001/133612; G02F 2001/133601; F21V 23/00; F21V 7/00; F21S 2/00; G09F 9/00
See application file for complete search history.

(56) References Cited

U.S. PATENT DOCUMENTS

| | | | |
|---|---|---|---|
| 2004/0125269 | A1 | 7/2004 | Kim et al. |
| 2004/0239829 | A1 | 12/2004 | Yu et al. |
| 2005/0265051 | A1 | 12/2005 | Yamamoto et al. |
| 2006/0092346 | A1 | 5/2006 | Moon et al. |
| 2007/0242477 | A1 | 10/2007 | Yoo et al. |
| 2008/0143916 | A1 | 6/2008 | Fujino et al. |
| 2009/0003002 | A1 | 1/2009 | Sato |
| 2009/0021932 | A1 | 1/2009 | Kim et al. |
| 2009/0121652 | A1 | 5/2009 | Kang et al. |
| 2009/0135331 | A1 | 5/2009 | Kawase |
| 2009/0167194 | A1 | 7/2009 | Mizuta |
| 2009/0201441 | A1 | 8/2009 | Laney et al. |
| 2009/0302780 | A1 | 12/2009 | Kim et al. |
| 2009/0309498 | A1 | 12/2009 | Park et al. |
| 2009/0310335 | A1 | 12/2009 | Park |
| 2010/0066752 | A1* | 3/2010 | Watanuki ............. G09G 3/3426 345/589 |
| 2010/0109562 | A1 | 5/2010 | Shen et al. |
| 2010/0156955 | A1 | 6/2010 | Kimura |
| 2011/0019126 | A1 | 1/2011 | Choi et al. |
| 2011/0050111 | A1 | 3/2011 | Tanaka et al. |
| 2011/0063850 | A1 | 3/2011 | Oide et al. |
| 2011/0304798 | A1* | 12/2011 | Tanaka ............. G02F 1/133603 349/64 |
| 2011/0310590 | A1 | 12/2011 | Yamashita et al. |
| 2012/0019490 | A1 | 1/2012 | Huang |
| 2012/0087122 | A1 | 4/2012 | Takeuchi et al. |
| 2012/0139445 | A1 | 6/2012 | Fujiwara et al. |
| 2012/0212682 | A1 | 8/2012 | Kuromizu |
| 2012/0218752 | A1 | 8/2012 | Sumitani |
| 2012/0293724 | A1 | 11/2012 | Ueyama |
| 2013/0069560 | A1 | 3/2013 | Kurita |
| 2013/0094187 | A1 | 4/2013 | Kamada |
| 2013/0229596 | A1 | 9/2013 | Hosoki |
| 2014/0211123 | A1 | 7/2014 | Lee et al. |

FOREIGN PATENT DOCUMENTS

| | | |
|---|---|---|
| EP | 2492742 A1 | 8/2012 |
| EP | 3318792 A1 | 5/2018 |
| EP | 3318793 A1 | 5/2018 |
| JP | 2001-338505 A | 12/2001 |
| JP | 2005-109228 A | 4/2005 |
| JP | 2006-128125 A | 5/2006 |
| JP | 2007-322697 | 12/2007 |
| JP | 2008-166304 A | 7/2008 |
| JP | 2008-270144 A | 11/2008 |
| JP | 2009-032593 A | 2/2009 |
| JP | 2009-140720 A | 6/2009 |
| JP | 2009-162952 A | 7/2009 |
| JP | 2009-222793 A | 10/2009 |
| JP | 2011-034949 | 2/2011 |
| JP | 2011-090949 A | 5/2011 |
| JP | 2012-004067 | 1/2012 |
| JP | 2012-089509 A | 5/2012 |
| JP | 2012-119436 A | 6/2012 |
| JP | 2012-174634 A | 9/2012 |
| JP | 2012-204337 | 10/2012 |
| JP | 2012-212509 A | 11/2012 |
| JP | 2013-182076 A | 9/2013 |
| JP | 2013-246988 | 12/2013 |
| JP | 2014-041830 | 3/2014 |
| JP | 2014-067679 A | 4/2014 |
| JP | 2014-149529 | 8/2014 |
| WO | 2008/156020 A1 | 12/2008 |
| WO | 2010/101062 A1 | 9/2010 |
| WO | 2011/058903 A1 | 5/2011 |

OTHER PUBLICATIONS

The Extended European Search Report dated Jun. 26, 2018 for the related European Patent Application No. 16841115.5.
The Extended European Search Report dated Jun. 22, 2018 for the related European Patent Application No. 16841116.3.
The Extended European Search Report dated Jun. 28, 2018 for the related European Patent Application No. 16841117.1.
The Extended European Search Report dated Jun. 14, 2018 for the related European Patent Application No. 16841118.9.
The Partial Supplementary European Search Report dated Jun. 27, 2018 for the related European Patent Application No. 16841119.7.
Non-Final Office Action issued in U.S. Appl. No. 15/750,881, dated Oct. 4, 2018.
International Search Report of PCT application No. PCT/JP2016/003943 dated Nov. 8, 2016.
International Search Report of PCT application No. PCT/JP2016/003939 dated Nov. 22, 2016.
International Search Report of PCT application No. PCT/JP2016/003942 dated Nov. 22, 2016.
International Search Report of PCT application No. PCT/JP2016/003940 dated Nov. 8, 2016.
International Search Report of PCT application No. PCT/JP2016/003945 dated Nov. 22, 2016.
The Extended European Search Report dated Sep. 24, 2018 for the related European Patent Application No. 16841119.7.
International Search Report of PCT application No. PCT/JP2016/003941 dated Nov. 8, 2016.
Non-Final Office Action issued in U.S. Appl. No. 15/750,883, dated Jan. 9, 2019.
Non-Final Office Action issued in U.S. Appl. No. 15/750,871, dated Jan. 2, 2019.
Final Office Action issued in U.S. Appl. No. 15/750,881, dated Apr. 30, 2019.
Non-Final Office Action issued in U.S. Appl. No. 15/750,886, dated Mar. 21, 2019.
Non-Final Office Action issued in U.S. Appl. No. 15/750,871, dated Jun. 13, 2019.
Final Office Action issued in U.S. Appl. No. 15/750,883, dated Jul. 1, 2019.
Notice of Allowance issued in U.S. Appl. No. 15/750,883, dated Sep. 3, 2019.

(56) References Cited

OTHER PUBLICATIONS

Non-Final Office Action issued in U.S. Appl. No. 15/750,886, dated Aug. 8, 2019.
Non-Final Office Action issued in U.S. Appl. No. 15/754,208, dated Aug. 8, 2019.
The EPC Office Action dated Jan. 13, 2020 for the related European Patent Application No. 16841115.5.
Notice of Allowance issued in U.S. Appl. No. 15/754,208, dated Jan. 23, 2020.

* cited by examiner

VIDEO DISPLAY DEVICE

This application is a U.S. national stage application of the PCT International Application No. PCT/JP2016/003941 filed on Aug. 30, 2016, which claims the benefit of foreign priority of Japanese patent applications No. 2015-172363 filed on Sep. 1, 2015 and No. 2016-047554 filed on Mar. 10, 2016, the contents all of which are incorporated herein by reference.

TECHNICAL FIELD

The present disclosure relates to a video display device including a backlight.

BACKGROUND ART

For example, various technologies for improving quality of images formed by a video display device including a backlight have been developed. A technology called local dimming is one of examples of these technologies.

Patent Literature 1 discloses a technology relating to local dimming.

CITATION LIST

Patent Literature

PTL 1: Unexamined Japanese Patent Publication No. 2014-41830

SUMMARY

However, in some cases, sufficient contrast improvement cannot be achieved by local dimming which uses the technology disclosed in Patent Literature 1.

Provided according to the present disclosure is a video display device capable of improving contrast achieved by local dimming.

A video display device according to an aspect of the present disclosure includes: a display panel that displays an image based on an input image signal; a light source substrate that includes a plurality of light sources on a main surface which is a front side of the light source substrate, and emits, toward a rear side of the display panel, light emitted from the plurality of light sources; a reflection sheet that is provided on the main surface of the light source substrate, and in which hollow partitioning walls each of which separates adjacent two light sources of the plurality of light sources are formed; an optical member that is provided between the display panel and the light source substrate, and uniformizes luminance distribution of the light emitted from the light source substrate; and support members each of which is provided between the light source substrate and the optical member, and supports the optical member. The reflection sheet includes intersection portions where the partitioning walls formed in a first direction and the partitioning walls formed in a second direction crossing the first direction cross each other, and further includes linear portions formed in parallel with the first direction or the second direction. Each of the support members is disposed in a recess portion formed in a corresponding linear portion.

The video display device according to the present disclosure is capable of improving contrast achieved by local dimming.

Figure 1:
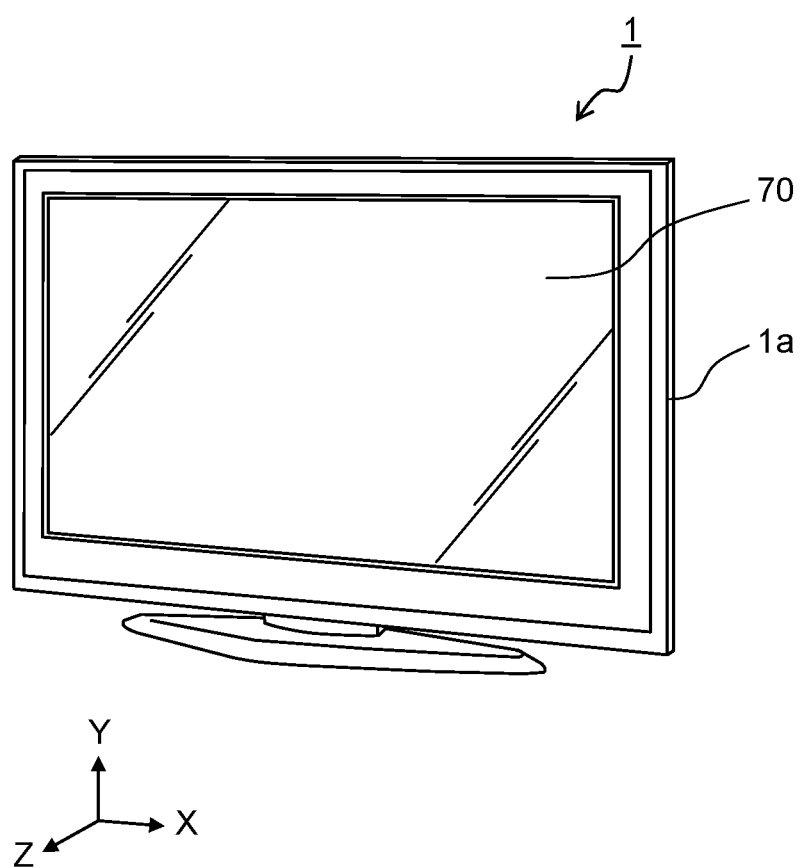
FIG. 1 is a view schematically illustrating an example of an external appearance of a video display device according to a first exemplary embodiment.

DESCRIPTION OF EMBODIMENTS (Knowledge on which the Present Disclosure is Based)

The inventor of the present application has found that following problems occur in a conventional video display device.

PTL 1 discloses a technology relating to local dimming Local dimming is a technology which divides a liquid crystal display panel into a plurality of areas, and dims each of the plurality of light sources disposed in corresponding one of the areas in accordance with brightness of an image formed in the corresponding area of the liquid crystal display panel. This technology enhances contrast of images within one screen. Each of the light sources is constituted by a light emitting diode (LED), for example.

According to a video display device which uses the technology disclosed in PTL 1, for example, it may occur that an area corresponding to one light source receives light entering from a light source corresponding to an area adjacent to the area. In this case, it may become difficult to obtain sufficient contrast improvement of an image displayed on a liquid crystal display panel. For example, assumed herein is such a liquid crystal display panel which displays a relatively dark image in an area corresponding to one light source, and a relatively bright image in an area adjacent to the foregoing area. In this case, light from the light source corresponding to the adjacent area (relatively bright area) leaks into the area corresponding to the one light source (relatively dark area), in which condition luminance of the area corresponding to the one light source increases. Accordingly, contrast between the two areas may not be sufficiently improved.

One of possible solutions for these problems may be such a configuration which provides a plurality of light sources on a light source substrate, and forms a reflection sheet on the light source substrate in an area other than positions of the plurality of light sources. The reflection sheet is so shaped as to produce partitioning walls between adjacent ones of the light sources. This configuration suppresses mutual leakage of lights from adjoining areas.

In addition, according to a video display device which includes a liquid crystal display panel, various types of optical members, such as a diffusion sheet for diffusing light, are disposed on the position closer to liquid crystal display panel than the light sources on the light source substrate. In this configuration, support members for supporting the optical members are provided on the light source substrate in some cases. However, the optical members supported by the support members may impose undesirable effects on light emitted from the light sources on the light source substrate. For example, when the optical members are supported by the support members in a state that a distance out of a predetermined range is produced between the optical members and the light sources, there may occur luminance lowering or luminance non-uniformity of a backlight constituted by the light source substrate. Accordingly, it is preferable that the distance between the optical members and the light sources be maintained within a predetermined range producing appropriate effects of the optical members. When the distance is excessively short or excessively long, luminance lowering or luminance non-uniformity of a backlight may be caused.

A video display device according to an aspect of the present disclosure includes: a display panel that displays an image based on an input image signal; a light source substrate that includes a plurality of light sources on a main surface which is a front side of the light source substrate, and emits, toward a rear side of the display panel, light emitted from the plurality of light sources; a reflection sheet that is provided on the main surface of the light source substrate, and in which hollow partitioning walls each of which separates adjacent two light sources of the plurality of light sources are formed; an optical member that is provided between the display panel and the light source substrate, and uniformizes luminance distribution of the light emitted from the light source substrate; and support members each of which is provided between the light source substrate and the optical member, and supports the optical member. The reflection sheet includes intersection portions where the partitioning walls formed in a first direction and the partitioning walls formed in a second direction crossing the first direction cross each other, and further includes linear portions formed in parallel with the first direction or the second direction. Each of the support members is disposed in a recess portion formed in a corresponding linear portion.

According to this configuration, the adjacent two light sources are separated by the partitioning wall of the reflection sheet. This configuration can prevent entrance of light emitted from a light source corresponding to an adjoining area into an area corresponding to one light source. In addition, each of the support members is disposed in the recess portion formed in the linear portion of the corresponding partitioning wall of the reflection sheet. In this case, the optical member can be supported via the support member provided on the partitioning wall and located at a position relatively close to the light source. Accordingly, the distance between the light source and the optical member can be more easily maintained in a predetermined range in comparison with such a case as to support the optical member via the support member located at a position relatively far from the light source. As a result, luminance lowering or luminance non-uniformity of a backlight constituted by a light source substrate can be suppressed, wherefore contrast achieved by local dimming further can be improved.

For example, the first direction and the second direction may be directions substantially perpendicular to each other. Each of the recess portions formed in the linear portion may be formed at a position in the partitioning wall disposed at least in either one of the first direction and the second direction with respect to the plurality of light sources.

In other words, each of the recess portions may be formed at least either in a position in the partitioning wall disposed in the first direction with respect to the light sources, and in a position in the partitioning wall in the second direction with respect to the light sources.

According to this configuration, each of the recess portions is disposed at a position closest to the light sources. More specifically, each of the support members provided on the linear portion of the corresponding partitioning wall of the reflection sheet is disposed at a position closest to the light sources. In this case, the distance between the light sources and the optical member is effectively maintained within a predetermined range in comparison with such a case as to support the optical member via the support member located at a position relatively far from the light sources. Accordingly, luminance lowering or luminance non-uniformity of a backlight constituted by the light source substrate can be suppressed.

For example, each of the support members may include a wall portion that has a shape corresponding to a shape of the recess portion of the partitioning wall.

According to this configuration, the support member can suppress mutual entrance of light emitted from the light sources disposed in the respective areas into the other areas, through the recess portion, in the areas adjacent to each other. Accordingly, luminance lowering or luminance non-uniformity of the backlight constituted by the light source substrate can be effectively suppressed.

For example, a surface of each of the partitioning walls may be inclined in such a direction that a thickness of the partitioning wall decreases in a direction toward the front side (toward the display panel). Each of the wall portions may include an inclined surface disposed on an extension line of a surface of the partitioning wall.

According to this configuration, light emitted from the light sources toward the support members is reflected on the inclined surfaces of the wall portions of the support members toward the display panel, similarly to reflection on the partitioning walls of the reflection sheet. Accordingly, luminance lowering or luminance non-uniformity of the backlight constituted by the light source substrate can be effectively suppressed.

For example, each of the support members may include a shaft portion that extends in a front-rear direction of the video display device, an engaging portion formed at an end of the shaft portion on the rear side, and a plate portion that is provided on the shaft portion with a predetermined clearance left between the plate portion and the engaging portion, and expands in a direction substantially perpendicular to the shaft portion. The shaft portion may further penetrate the light source substrate and the reflection sheet. Penetration portions formed in the light source substrate and the reflection sheet and penetrated by the shaft portion may be sandwiched between the engaging portion and the plate portion.

According to this configuration, the support members can effectively press the reflection sheet toward the light source substrate to prevent separation of the reflection sheet from the light source substrate.

For example, the video display device may further include a support substrate in which a plurality of through holes are formed, the light source substrate is disposed on the front side of the support substrate. Each of the plurality of through holes may have a shape different from a shape of rotation symmetry except for line symmetry. The shaft portion of each of the support members may further penetrate a corresponding through hole of the support substrate. A portion corresponding to each of the through holes in the support substrate may be sandwiched between the engaging portion and the plate portion. A cross section of the shaft portion in a portion penetrating each of the through holes may have a shape corresponding to a shape of the corresponding through hole. A first through hole included in the plurality of through holes and provided at a position corresponding to the linear portion that is parallel with the first direction may have a shape of a second through hole provided at a position corresponding to the linear portion that is parallel with the second direction and rotated by an angle formed by the first direction and the second direction.

According to this configuration, an operator is capable of positioning the support members in an appropriate posture without the necessity of determining whether the support members are to be positioned on the linear portions in parallel with the first direction, or the linear portions in parallel with the second direction at the time of attachment of the support members to the support substrate by the operator. Accordingly, assembly efficiency of the operator at the time of manufacture of the video display device can improve.

For example, each of the support members may include a support surface that regulates approach of the optical member toward the light sources in excess of a first predetermined clearance.

According to this configuration, the distance between the optical member and the light sources can be easily maintained at the first predetermined clearance.

For example, the video display device may further include an optical sheet disposed between the display panel and the optical member. An end of each of the support members on a side toward the display panel may regulate approach of the optical sheet toward the light sources in excess of a second predetermined clearance.

According to this configuration, the distance between the optical sheet and the light sources can be easily maintained at the second predetermined clearance.

Exemplary embodiments are hereinafter described in detail with reference to the drawings as necessary. However, excessive details may be omitted in the following description. For example, detailed description of well-known matters, and repetitive description of substantially identical configurations may be omitted. This omission is made for avoiding excessive redundancy of the following description, and facilitating understanding by those skilled in the art.

Note that each of the exemplary embodiments described herein is only presented as a specific example of the present disclosure. Numerical values, shapes, materials, constituent elements, and positions and connection manners of the constituent elements included in the following exemplary embodiments are presented by way of example, and not intended to limit the subject matters of the present disclosure. In addition, constituent elements included in the following exemplary embodiments and not contained in the independent claims defining the highest concepts are described as optional constituent elements.

Note that the accompanying drawings and the following description are presented to help those skilled in the art fully understand the present disclosure. It is therefore not intended that the subject matters defined in the appended claims be limited to those drawings and description.

Moreover, the respective figures are schematic views and not necessarily precise depictions. Furthermore, substantially identical constituent elements in the respective figures have been given identical reference numbers. Description of these elements are omitted or simplified in some cases.

First Exemplary Embodiment

Video display device 1 according to a first exemplary embodiment is hereinafter described with reference to FIGS. 1 through 11. It is assumed that three axes of X axis, Y axis, and Z axis are defined in the respective figures in this exemplary embodiment. The X axis is an axis extending in a direction in parallel with a long side of a display panel (horizontal direction in FIG. 1). The Y axis is an axis extending in parallel with a short side of the display panel (vertical direction in FIG. 1). The Z axis is an axis perpendicular to both the X and Y axes (direction in parallel with front-rear direction of video display device 1). However, these axes are defined only for convenience and not intended to limit the present disclosure.

[1-1. Configuration]

Video display device 1 according to the first exemplary embodiment is a liquid crystal display device which includes a liquid crystal display panel as a display panel, and light source substrates for illuminating the display panel from a rear side of the display panel. Video display device 1 is an example of a video display device. Mounted on each of the light source substrates are a plurality of light sources each of which is provided in corresponding one of areas different from each other in the display panel, and further are driver elements for driving (dimming) each of the plurality of light sources such that light is emitted from the light sources with luminance corresponding to brightness indicated by a control signal (brightness of an image within the corresponding area). Note that brightness of an image within the corresponding area in this context refers to brightness of the image in the area of the display panel illuminated by one light source (i.e., partial brightness of the image in the area corresponding to the light source).

FIG. 1 is a view schematically illustrating an example of an external appearance of video display device 1 according to the first exemplary embodiment.

As illustrated in FIG. 1, video display device 1 has an external appearance of an ordinary flat panel display, and includes display panel 70 and light source substrates (not shown in FIG. 1). Display panel 70 and the light source substrates are stored in housing 1a having an opened front surface. According to this exemplary embodiment, surfaces of video display device 1 and respective constituent members of video display device 1 facing a user (surface on the side illustrated in FIG. 1) are referred to as front surfaces, while surfaces on the side opposite to the front surfaces (back surfaces) are referred to as rear surfaces.

Figure 2:
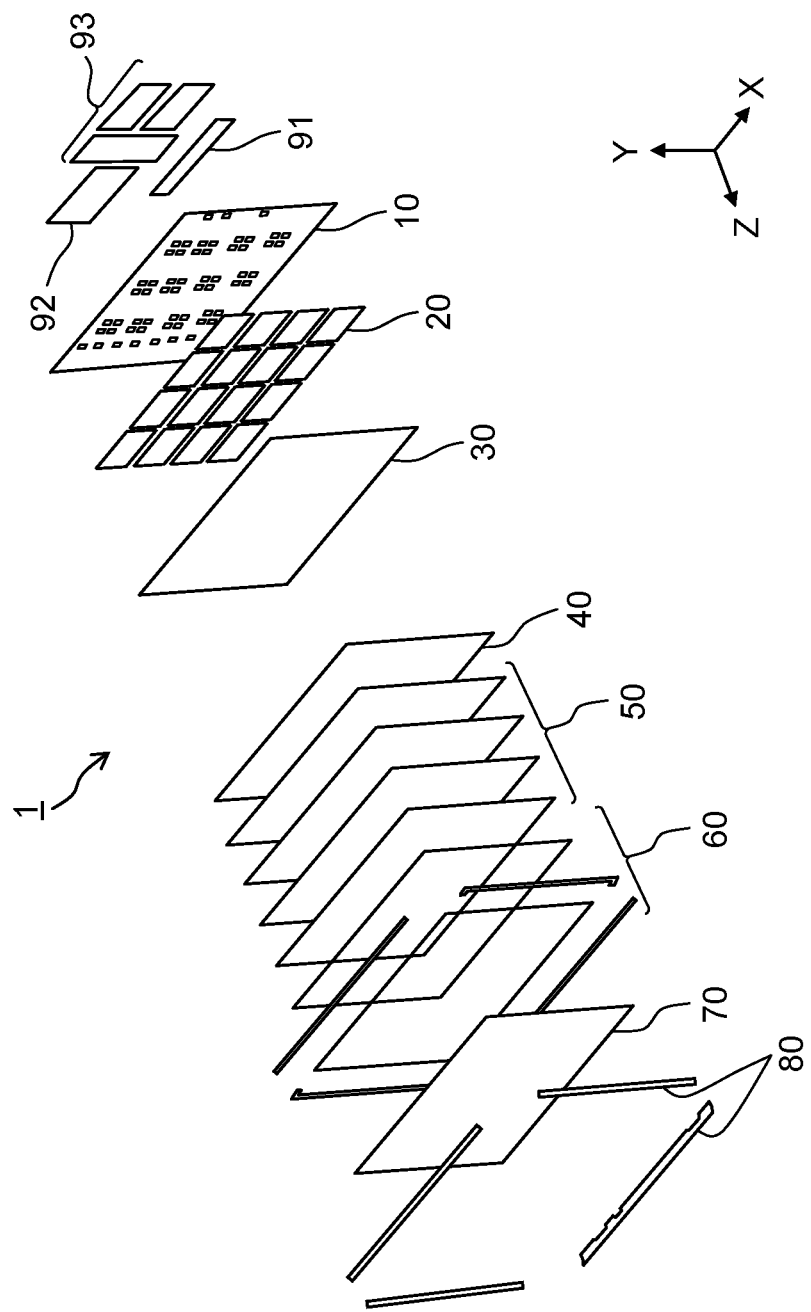
FIG. 2 is an exploded perspective view schematically illustrating an example of a configuration of the video display device according to the first exemplary embodiment.

FIG. 2 is an exploded perspective view schematically illustrating an example of a configuration of video display device 1 according to the first exemplary embodiment.

Figure 3:
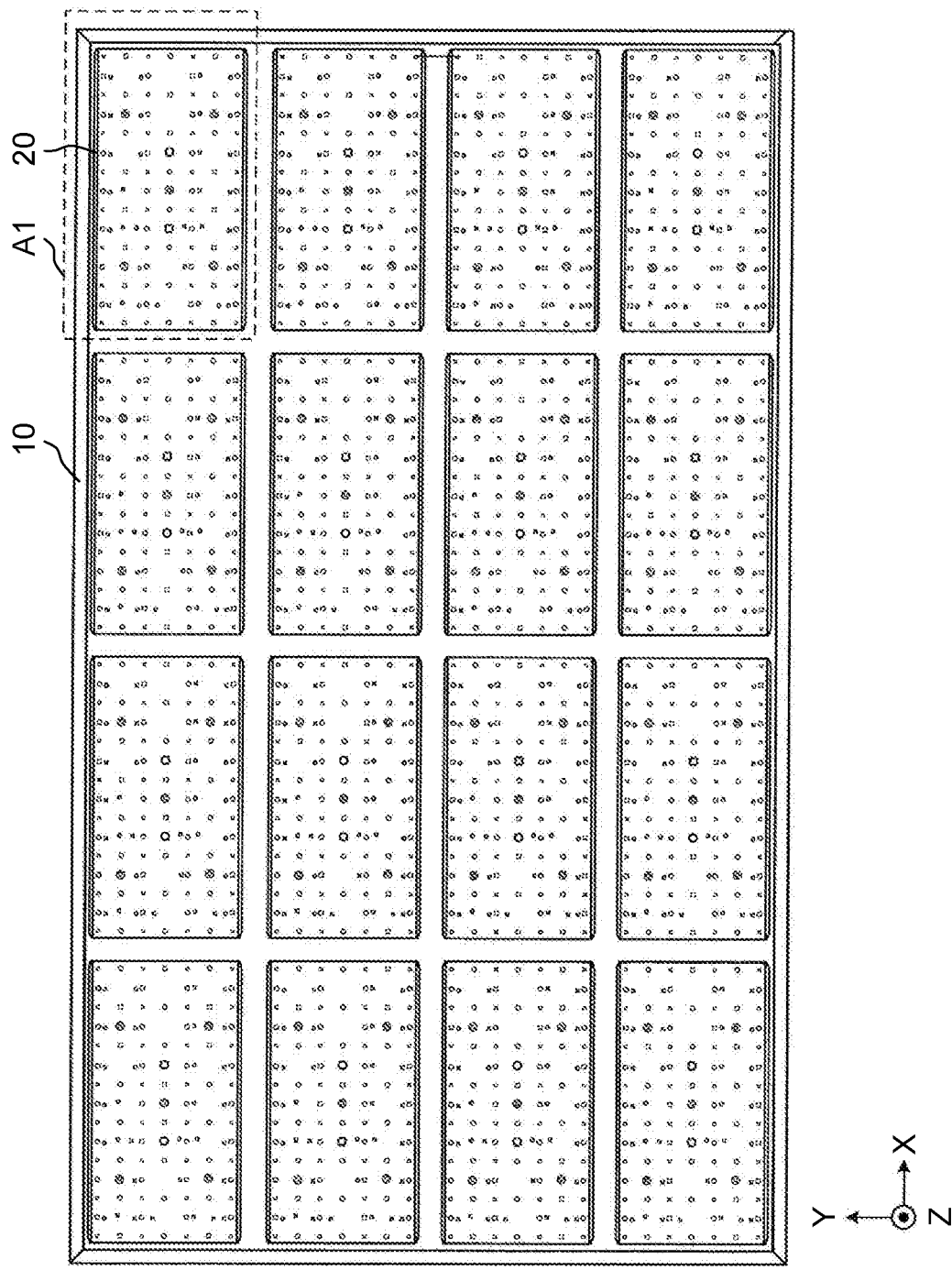
FIG. 3 is a plan view schematically illustrating an example of a base plate to which light source substrates included in the video display device according to the first exemplary embodiment have been attached.

FIG. 3 is a plan view schematically illustrating an example of base plate 10 to which light source substrates 20 included in video display device 1 according to the first exemplary embodiment have been attached. Note that FIG. 3 illustrates a plan view as viewed from a front side of base plate 10.

As illustrated in FIG. 2, video display device 1 includes base plate 10, a plurality of light source substrates 20, reflection sheet 30, flatter 40, various types of optical sheets 50, mold frame 60, display panel 70, bezel 80, connection terminal substrate 91, signal processing substrate 92, and power supply substrate 93. These members are stored in housing 1a (see FIG. 1) to constitute video display device 1. Note that video display device 1 further includes support members, a fastening member, a reinforcing member and the like not shown in the figures, besides the foregoing members. These not-shown parts will be described below as necessary.

Base plate 10 is a support substrate corresponding to a base to which light source substrates 20, connection terminal substrate 91, signal processing substrate 92, and power supply substrate 93 are attached. Base plate 10 is made of sheet metal, for example, but may be made of other materials. Base plate 10 includes through holes and screw holes formed for attachment of the support members, openings formed for connection between light source substrates 20 via cables passing through a rear side of base plate 10, and others.

Light source substrates 20 constitute a backlight module provided on a rear side of display panel 70 and illuminating the rear side of display panel 70. Each of light source substrates 20 includes a plurality of light sources disposed on a main surface which is a front side of light source substrate 20, and applies light emitted from the plurality of light sources to the rear side of display panel 70. Each of light source substrates 20 further includes driver elements disposed on the main surface which is a front side of light source substrate 20 to drive each of the plurality of light sources. Each of the plurality of light sources is constituted by a light emitting diode (LED). Accordingly, each of the plurality of light sources is a point light source. As illustrated in FIG. 3, the plurality of light source substrates 20 having an identical shape are disposed in matrix and attached to a front surface (surface on the side toward display panel 70) of base plate 10. The plurality of light source substrates 20 constitute a direct-type backlight for illuminating display panel 70. Light source substrate 20 will be detailed below.

Reflection sheet 30 is disposed on main surfaces of light source substrates 20 (surfaces on the side toward display panel 70) where the plurality of light sources are provided. Reflection sheet 30 includes openings penetrated by light sources (light sources 21 of light source substrates 20 illustrated in FIG. 4). Reflection sheet 30 is a sheet configured such that a part of light emitted from the light sources and reflected on reflection sheet 30 travels toward the front side (toward display panel 70). Reflection sheet 30 is made of white synthetic resin, for example, but may be made of other white materials. Hollow partitioning walls (see FIG. 5) each of which protrudes toward the front side and separates adjacent two light sources of the plurality of light sources are formed in reflection sheet 30. Accordingly, each periphery of the light sources is surrounded by the corresponding partitioning walls, in which condition each of the light sources illuminates an area surrounded by the corresponding partitioning walls around the corresponding light source. Reflection sheet 30 will be detailed below.

Flatter 40 is a sheet-shaped optical member provided on the front side (the side toward display panel 70) of reflection sheet 30 to uniformize luminance distribution of light emitted from light source substrates 20 (to improve uniformity of luminance distribution). Flatter 40 transmits light emitted from the light sources not uniformly, but with distribution of light transmittance (hereinafter also abbreviated as "transmittance") produced in each of the areas illuminated by the light sources. Note that distribution of transmittance in this exemplary embodiment refers to a state of a presence of distribution containing relatively high-transmittance portions and relatively low-transmittance portions. Flatter 40 is made of synthetic resin, for example, but may be made of other materials. When flatter 40 is absent, luminance differences may be produced in the areas illuminated by the light sources of light source substrates 20 in a state that each of the light sources of light source substrates 20 is a point light source constituted by an LED as described above. Flatter 40 is configured to produce transmittance distribution determined to cancel these luminance differences as predetermined transmittance distribution. Accordingly, luminance at each of different positions within the area illuminated by the corresponding light source can approach uniform luminance by the presence of flatter 40, wherefore uniformity of luminance within the corresponding area can increase. As described above, flatter 40 is provided between display panel 70 and light source substrates 20 to uniformize luminance distribution of light emitted from light source substrates 20 (to increase uniformity of luminance distribution). Flatter 40 will be detailed below.

Optical sheets 50 are sheets disposed between display panel 70 and flatter 40 to perform various types of optical functions other than the function of flatter 40. For example, optical sheets 50 include a diffusion plate which diffuses light to further increase uniformity of luminance, a prism sheet which equalizes traveling paths of light into a frontward direction to increase luminance visually recognized by the user, and others. For example, optical sheets 50 may be constituted by synthesis resin on which surface fine shapes corresponding to respective functions are formed. Appropriate effects of optical sheets 50 are produced when a distance between the light sources of light source substrates 20 and optical sheets 50 falls within a predetermined range. Accordingly, it is preferable that the distance between optical sheets 50 and the light sources be maintained within an appropriate range (such as a range not smaller than a second predetermined clearance).

Mold frame 60 is a support member which supports an outer periphery of display panel 70 from the rear surface. Mold frame 60 is made of synthetic resin, for example, but may be made of other materials. In addition, mold frame 60 may be fixed to base plate 10.

Display panel 70 is a liquid crystal panel for image display constituted by a plurality of pixels arranged in matrix. Display panel 70 displays an image based on an image signal input to a driving circuit (not shown).

Bezel 80 is a support member which supports the outer periphery of display panel 70 from the front surface. Bezel 80 is made of metal, for example, but may be made of synthetic resin.

Connection terminal substrate 91 is a circuit substrate which includes terminals and an interface circuit for receiving image signals. Signal processing substrate 92 is a circuit substrate which includes a signal processing circuit for processing image signals. Signal processing substrate 92 further includes a circuit which generates control signals for controlling (dimming) luminance of the light sources of light source substrates 20 based on image signals. Power supply substrate 93 is a circuit substrate which includes a power supply circuit for supplying operation power (hereinafter also abbreviated as "power") to video display device 1. Connection terminal substrate 91, signal processing substrate 92, and power supply substrate 93 are attached to the rear surface of base plate 10.

Light source substrates 20 are hereinafter described.

Figure 4:
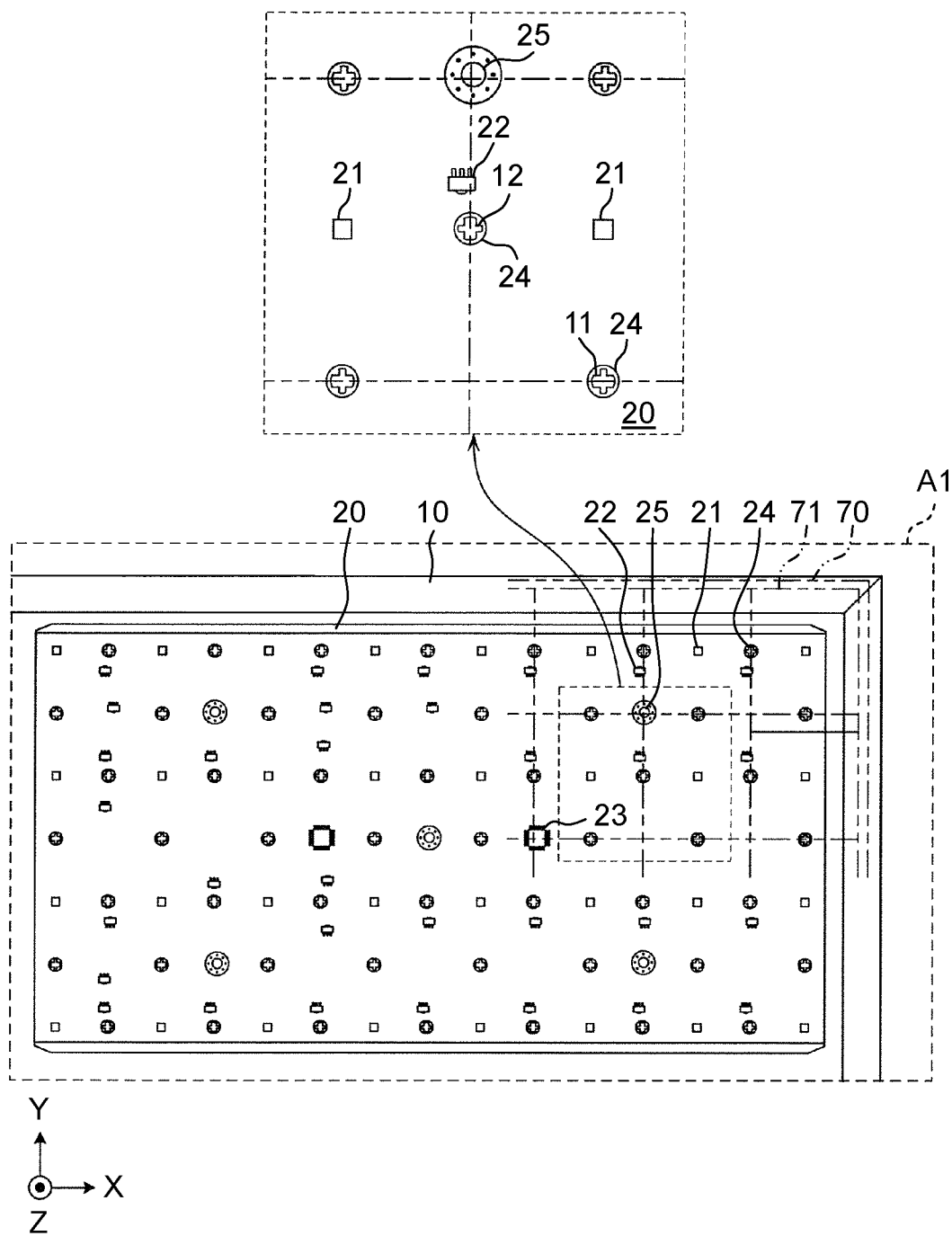
FIG. 4 is a plan view schematically illustrating an example of a configuration of the light source substrate included in the video display device according to the first exemplary embodiment.

FIG. 4 is a plan view schematically illustrating an example of a configuration of each of light source substrates 20 included in video display device 1 according to the first exemplary embodiment. A view shown in a lower part of FIG. 4 is an enlarged view of area A1 of FIG. 3. FIG. 4 illustrates an example of respective members disposed on the front surface of light source substrate 20. Note that a view in an upper part of FIG. 4 is an enlarged view (partial enlarged view) of an area surrounded by a broken line in the figure in the lower part of FIG. 4. In addition, positions corresponding to areas 71 of display panel 70 illuminated by respective light sources 21 are indicated by alternate long and two short dashes lines in a part of FIG. 4 for convenience to facilitate visual understanding.

As illustrated in FIG. 4, the plurality of light sources 21, and the plurality of driver elements 22 and driver elements 23 are mounted on light source substrate 20.

Each of light sources 21 is provided on corresponding one of areas 71 different from each other in display panel 70. Each of light sources 21 is constituted by a high-voltage LED. The high-voltage LED in this context refers to an LED constituted by a plurality of LED elements (i.e., a plurality of pn junctions) connected in series. The high-voltage LED is an LED to which higher voltage is applicable than a single LED element (low-voltage LED). Moreover, when higher voltage is applied, the high-voltage LED can provide higher light emission luminance than a single LED element in a state of flow of substantially the same current.

Each of driver elements 22 and driver elements 23 is a semiconductor element for driving light sources 21 based on a control signal supplied from signal processing substrate 92. A control signal indicating brightness of an image in area 71 associated with each of light sources 21 is supplied from signal processing substrate 92 to corresponding driver element 22 and driver element 23. In this case, driver element 22 and driver element 23 drive (dim) corresponding light source 21 such that light is emitted with luminance corresponding to the brightness indicated by the control signal. Each of driver elements 22 may be constituted by a metal-oxide semiconductor (MOS) transistor, for example. Each of driver elements 23 may be constituted by a semiconductor integrated circuit (IC) which generates a gate signal of driver element 22 from a control signal, for example.

In light source substrate 20, openings 24 penetrated by support members supporting flatter 40, and screw holes 25 which receive screws fastened to fix light source substrates 20 to base plate 10 are formed. On the other hand, base plate 10 to which light source substrates 20 are attached includes through holes 11 and through holes 12 each of which has a shape smaller than each shape of openings 24, and receives a support member to stand the support member on base plate 10.

Through holes 11, through holes 12, and screw holes (not shown) on base plate 10 are disposed on boundaries of adjoining areas 71. Similarly, each of driver elements 22, driver elements 23, openings 24, and screw holes 25 on light source substrate 20 are disposed on boundaries of adjoining areas 71. Advantageous effects offered from this layout will be described below.

Reflection sheet 30 is hereinafter described.

Figure 5:
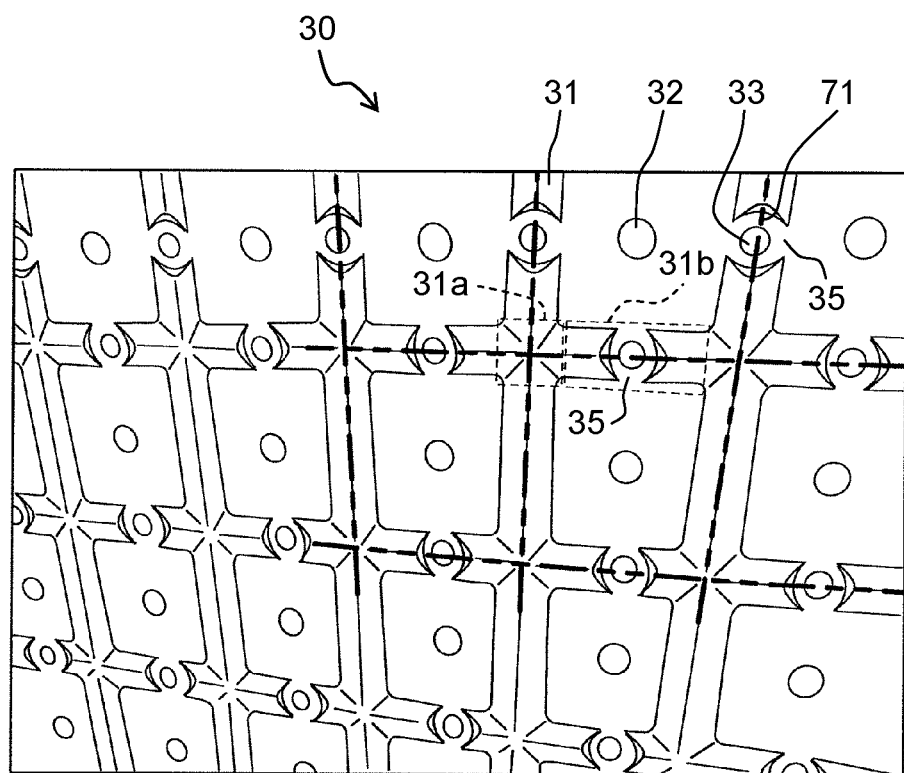
FIG. 5 is a perspective view schematically illustrating an example of a shape of a reflection sheet included in the video display device according to the first exemplary embodiment.

FIG. 5 is a perspective view schematically illustrating an example of a shape of reflection sheet 30 included in video display device 1 according to the first exemplary embodiment. Positions corresponding to areas 71 are indicated by alternate long and two short dashes lines in a part of FIG. 5 for facilitating visual understanding.

As illustrated in FIG. 5, reflection sheet 30 includes partitioning walls 31, openings 32, and openings 33.

Openings 32 are provided at positions corresponding to light sources 21 of light source substrate 20 disposed on the rear side of reflection sheet 30. Light sources 21 are exposed from the rear surface of reflection sheet 30 through openings 32 toward the front surface of reflection sheet 30.

Reflection sheet 30 is made of white synthetic resin to reflect light emitted from light sources 21. Light is emitted from light sources 21 penetrating openings 32 and exposed to the front surface, a part of which light (light such as traveling rearward) is reflected on reflection sheet 30 toward the front side (toward display panel 70).

Each of partitioning walls 31 formed by reflection sheet 30 is a hollow part which protrudes toward the front side (toward display panel 70, plus side in Z axis direction (see FIGS. 2 and 4). Each of partitioning walls 31 is formed at a position separating adjacent ones of openings 32 (i.e., adjacent ones of light sources 21). Each of partitioning walls 31 of reflection sheet 30 includes intersection portion 31a at which a portion extending in a first direction and a portion extending in a second direction cross each other, and linear portion 31b extending in parallel with the first direction or the second direction. The first direction corresponds to the X axis direction, for example, while the second direction corresponds to the Y axis direction (see FIGS. 2 and 4), for example. However, the first and second directions according to the present disclosure are not limited to these specific directions. For example, the respective directions may be oppositely defined.

In addition, linear portion 31b of each of partitioning walls 31 includes recess portion 35. Each of recess portions 35 is formed so that a part of corresponding partitioning wall 31 does not protrude. Each of recess portions 35 is formed in corresponding partitioning wall 31 disposed at least in either one of the first direction (such as X axis direction) and the second direction (such as Y axis direction) with respect to openings 32 (in other words, light sources 21). In other words, each of recess portions 35 is formed at least in corresponding partitioning wall 31 disposed in the first direction with respect to corresponding opening 32 (light source 21), or in corresponding partitioning wall 31 disposed in the second direction with respect to corresponding opening 32 (light source 21).

In addition, frontward protrusion of each of partitioning walls 31 becomes largest on the corresponding boundary line of adjoining areas 71. Each thickness of partitioning walls 31 decreases in the direction toward the front side (i.e., width in the direction perpendicular to the extension direction of linear portion 31b decreases). More specifically, each of partitioning walls 31 has inclined surface 31c inclined to a display surface of display panel 70. Inclined surface 31c is inclined in such a direction as to decrease the thickness of partitioning wall 31 (see FIGS. 7 and 8). Each of inclined surfaces 31c is configured such that light emitted from light source 21 toward partitioning wall 31 is reflected on inclined surface 31c toward the front side (toward display panel 70).

Opening 33 is formed at each of recess portions 35 of partitioning walls 31 of reflection sheet 30. Support members penetrate openings 33 as described below.

Flatter 40 is hereinafter described.

Figure 6:
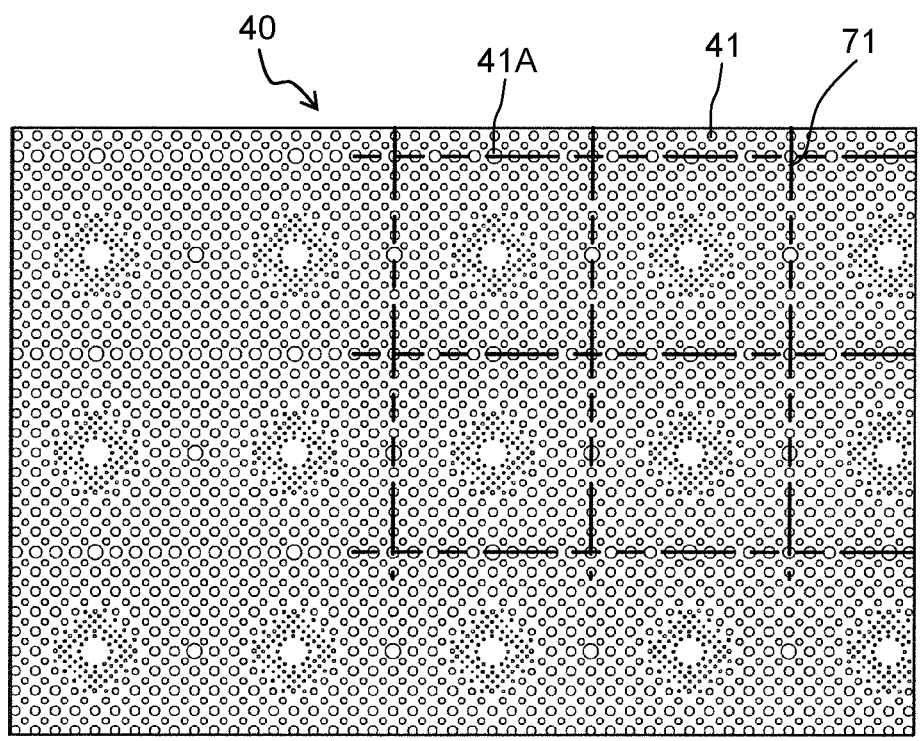
FIG. 6 is a plan view schematically illustrating an example of a shape of a flatter included in the video display device according to the first exemplary embodiment.

FIG. 6 is a plan view schematically illustrating an example of a shape of flatter 40 included in video display device 1 according to the first exemplary embodiment. Positions corresponding to areas 71 are indicated by alternate long and two short dashes lines in a part of FIG. 6 for facilitating visual understanding.

As illustrated in FIG. 6, holes 41 in various sizes are formed in a sheet of flatter 40 made of synthetic resin. Flatter 40 controls transmittance of light by using holes 41. More specifically, flatter 40 has distribution of transmittance within areas 71 in accordance with a layout (size, position, number) of holes 41. Distribution of transmittance of flatter 40 is so designed as to cancel luminance distribution (luminance variations) which may be produced by light sources 21 within areas 71 when flatter 40 is absent. Flatter 40 therefore exhibits predetermined transmittance distribution determined to cancel luminance distribution produced by light sources 21. This configuration of flatter 40 can improve luminance uniformity within areas 71. Note that the transmittance distribution of flatter 40 is so designed as to obtain appropriate effects when a distance between flatter 40 and light sources 21 is maintained at a predetermined distance (hereinafter referred to as first predetermined clearance). It is therefore preferable that the clearance between flatter 40 and light sources 21 is maintained at the first predetermined clearance to obtain appropriate effects produced by flatter 40.

Attachment of reflection sheet 30 to light source substrate 20 by using support member 100 is hereinafter described.

Figure 7:
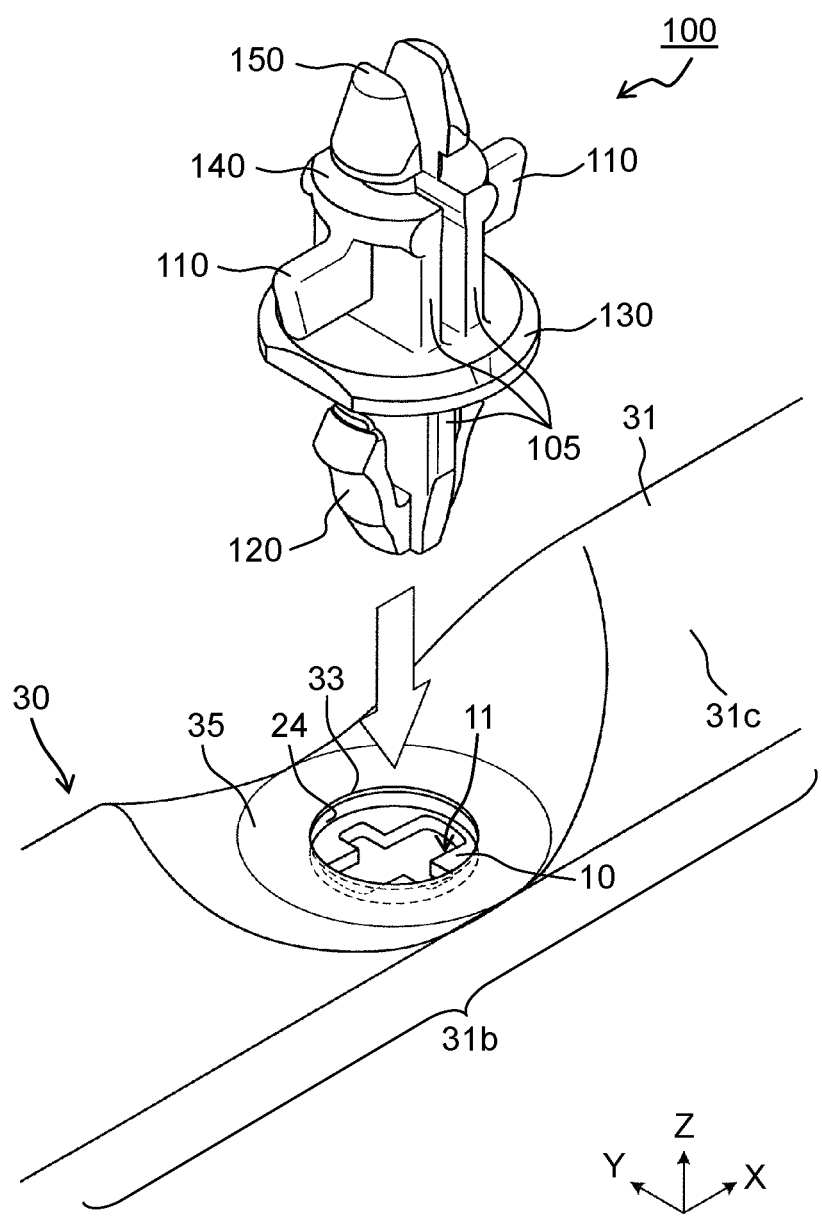
FIG. 7 is a perspective view schematically illustrating an attachment example of a support member to the base plate included in the video display device according to the first exemplary embodiment.

FIG. 7 is a perspective view schematically illustrating an attachment example of support member 100 attached to base plate 10 included in video display device 1 according to the first exemplary embodiment.

Figure 8:
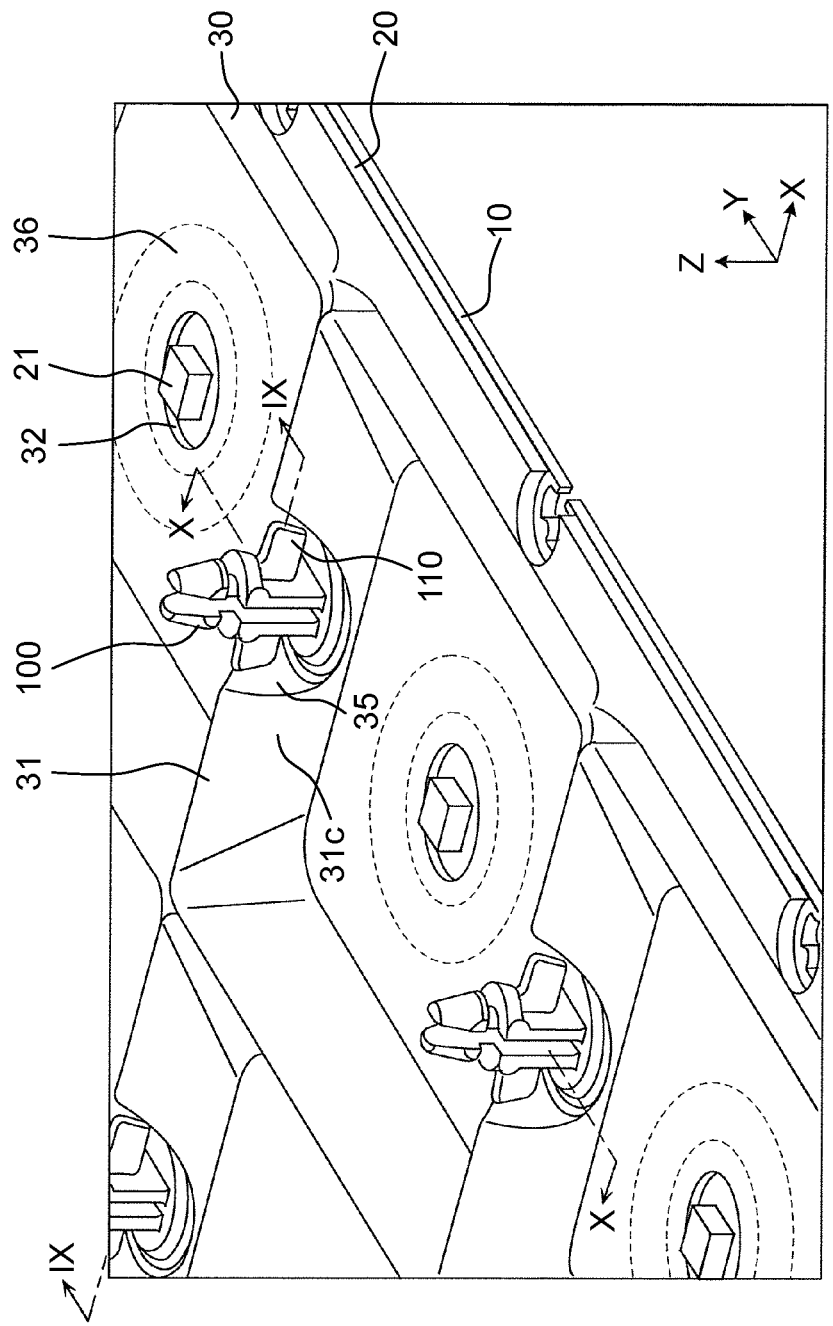
FIG. 8 is a perspective view schematically illustrating an attachment example of the reflection sheet attached to the light source substrate in the video display device according to the first exemplary embodiment.

FIG. 8 is a perspective view schematically illustrating an attachment example of reflection sheet 30 attached to light source substrate 20 in video display device 1 according to the first exemplary embodiment.

Figure 9:
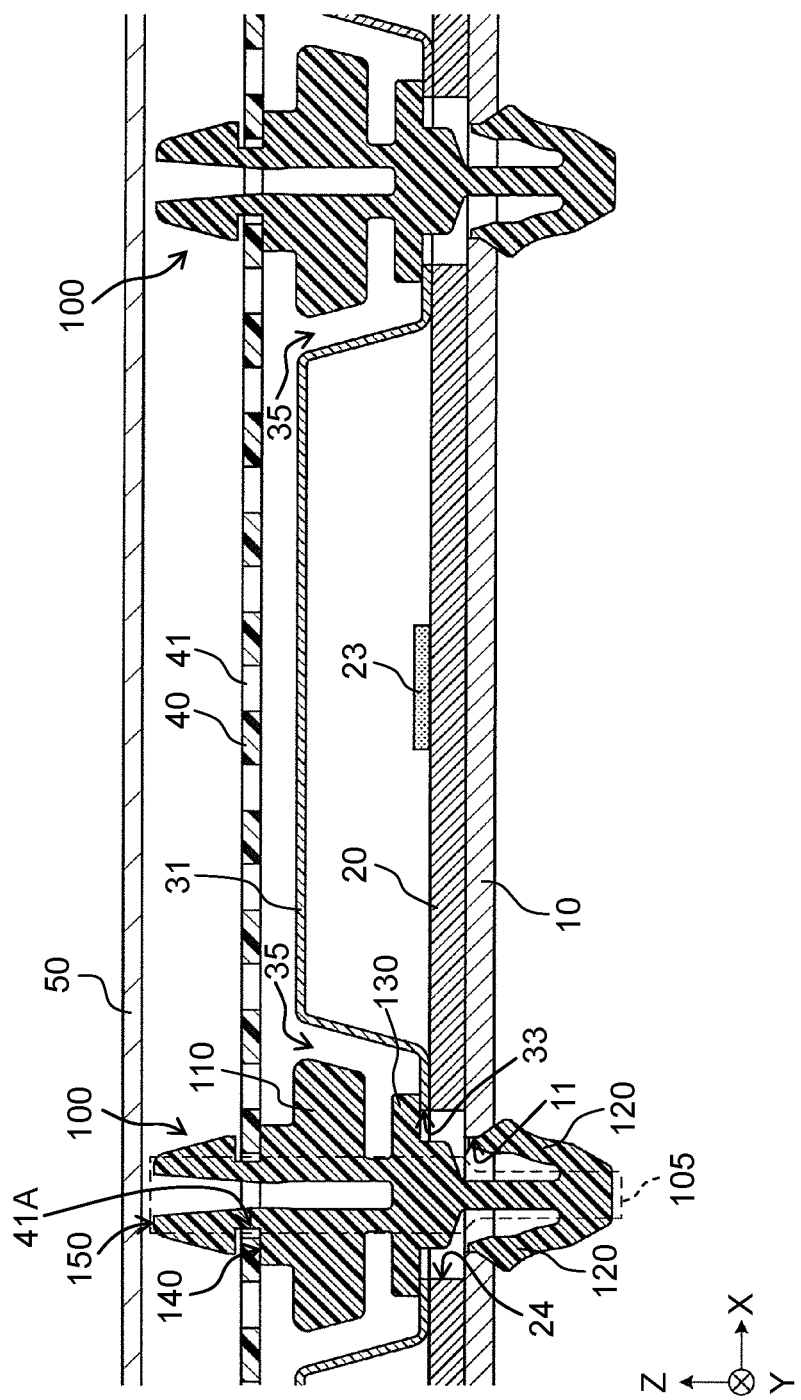
FIG. 9 is a cross-sectional view schematically illustrating an example of a layout of respective members in the video display device according to the first exemplary embodiment.
Figure 10:
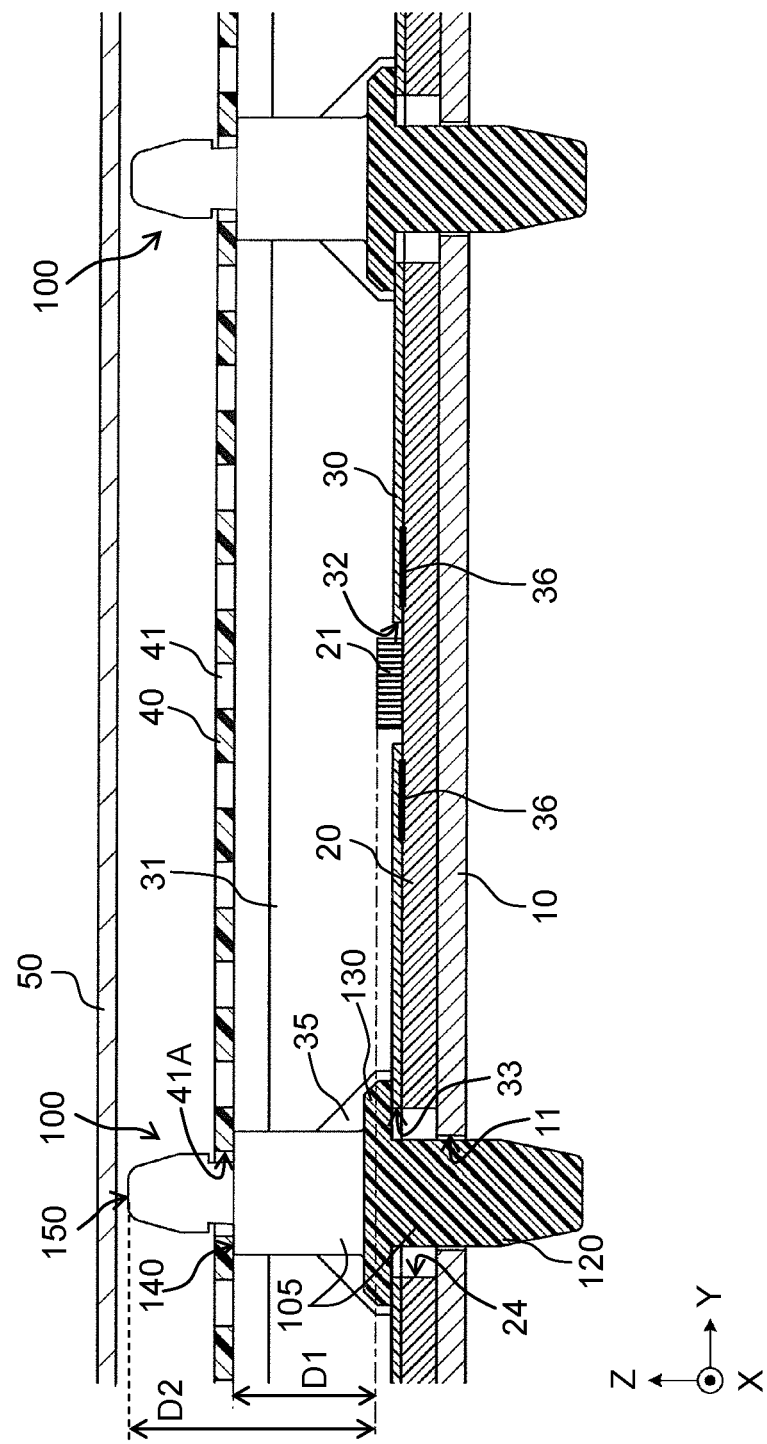
FIG. 10 is a cross-sectional view schematically illustrating an example of a layout of respective members in the video display device according to the first exemplary embodiment.

FIGS. 9 and 10 are cross-sectional views schematically illustrating an example of a layout of respective members included in video display device 1 according to the first exemplary embodiment. FIG. 9 illustrates a cross-sectional view taken along a line IX-IX in FIG. 8, while FIG. 10 illustrates a cross-sectional view taken along a line X-X in FIG. 8. FIG. 8 does not show flatter 40 and optical sheet 50, while FIGS. 9 and 10 illustrate flatter 40 and optical sheet 50.

Initially, a configuration of support member 100 is described.

As illustrated in FIGS. 7 through 10, support member 100 includes wall portion 110 which has a shape corresponding to a shape of recess portion 35 of partitioning wall 31. Support member 100 further includes shaft portion 105, engaging portion 120, and plate portion 130. Support member 100 is made of white synthetic resin, for example, but may be made of other materials.

Wall portion 110 corresponds to a portion protruding in an extension direction of linear portion 31b of partitioning wall 31 (X axis direction in FIG. 7) from both sides of shaft portion 105 extending in a front-rear direction of video display device 1 (Z axis direction in FIG. 7) in an attachment state of support member 100 to base plate 10. Each of wall portions 110 is shaped to close recess portion 35 of partitioning wall 31 and fill up partitioning wall 31 divided by recess portion 35. Support member 100 is described hereinbelow on the assumption that support member 100 has been attached to base plate 10.

Shaft portion 105 is a portion extending in the front-rear direction of video display device 1 (Z axis direction in FIG. 7). Shaft portion 105 penetrates base plate 10, light source substrate 20, reflection sheet 30, and flatter 40.

More specifically, shaft portion 105 in a part on the front side of plate portion 130 (the side toward display panel 70, plus side in Z axis direction in FIG. 7) is divided into two parts in the extension direction of linear portion 31b (X axis direction in FIG. 7). Each of two divisions of shaft portion 105 includes wall portion 110 on a side surface of shaft portion 105 opposite to a side surface thereof facing the corresponding side surface of the other division. Note that shaft portion 105 is indicated by a broken line in FIG. 9.

Engaging portion 120 is formed at a rear side end (minus side in Z axis direction in FIG. 7) of shaft portion 105. Shaft portion 105 includes a portion on the rear side with respect to plate portion 130 (minus side in Z axis direction in FIG. 7) which has a rectangular shaft cross section elongated in the direction perpendicular to the extension direction of linear portion 31b (Y axis direction in FIG. 7). In addition, the portion of shaft portion 105 on the rear side with respect to plate portion 130 (minus side in Z axis direction in FIG. 7) penetrates base plate 10, light source substrate 20, and reflection sheet 30 in a state of attachment of support member 100 to base plate 10.

Engaging portion 120 is formed at an end on the rear side of shaft portion 105 (minus side in Z axis direction in FIG. 7). Engaging portion 120 is shaped to engage with through hole 11 of base plate 10 in the state of attachment of support member 100 to through hole 11. Engaging portion 120 is a hook-shaped portion which protrudes from shaft portion 105 obliquely toward the front side (plus side in Z axis direction in FIG. 7) while extending in the extension direction of linear portion 31b (X axis direction in FIG. 7). Engaging portion 120 engages with through hole 11 of base plate 10 by engagement between a hook-shaped tip of engaging portion 120 and a rear side of through hole 11 of base plate 10 (minus side in Z axis direction in FIG. 7).

Plate portion 130 is provided on shaft portion 105 with a predetermined clearance left between plate portion 130 and engaging portion 120, and expands in a direction substantially perpendicular to shaft portion 105. Plate portion 130 corresponds to a flange-shaped portion expanding in a direction parallel with a surface of base plate 10 (X-Y plane in FIG. 7).

Penetration portions of base plate 10, light source substrate 20, and reflection sheet 30 penetrated by shaft portion 105 are sandwiched between engaging portion 120 and plate portion 130 in a state that support member 100 is attached to through hole 11 of base plate 10. In other words, the predetermined clearance described above has a length sufficient for producing this sandwiched condition of the penetration portions. More specifically, the penetration portions contain a portion in which through hole 11 of base plate 10 is formed, a portion in which opening 24 of light source substrate 20 is formed, and a portion in which opening 33 of reflection sheet 30 is formed. Accordingly, support member 100 effectively presses reflection sheet 30 toward light source substrate 20 by using engaging portion 120 and plate portion 130 to prevent separation of reflection sheet 30 from light source substrate 20.

In addition, a flat portion of reflection sheet 30 around opening 32 through which light source 21 penetrates for exposure is affixed to light source substrate 20 via adhesive tape 36 (see FIGS. 8 and 10). Reflection sheet 30 is fixed to light source substrate 20 in this manner.

Light source 21 of light source substrate 20 penetrates from the rear surface of reflection sheet 30 through opening 32 for exposure to the front surface of reflection sheet 30 (see FIGS. 8 and 10). Driver element 23 of light source substrate 20 is stored in a space inside partitioning wall 31 (space formed by partitioning wall 31 between the rear surface of reflection sheet 30 and the front surface of light source substrate 20) (see FIG. 9).

While not shown in FIGS. 7 through 10, light source substrate 20 is fixed to base plate 10 via a screw passing through screw hole 25 (see FIG. 4) and attached to base plate 10. In this case, a head portion of the screw, driver element 22 and others are also stored within partitioning wall 31.

Moreover, a portion of shaft portion 105 of support member 100 on the front side with respect to wall portion 110 (the side toward display panel 70, plus side in the Z axis direction in FIG. 7) penetrates particular hole 41A of flatter 40 (see FIGS. 9 and 10). Furthermore, support surface 140 for supporting flatter 40 is provided below a penetration portion of support member 100 through hole 41A. More specifically, flatter 40 is supported by engagement between particular hole 41A formed in flatter 40 and a notch formed in an upper portion of support member 100. Support surface 140 is a portion which regulates approach of flatter 40 toward light source 21 in excess of first predetermined clearance D1. Accordingly, support member 100 is capable of easily maintaining the distance between flatter 40 and light source 21 at first predetermined clearance D1 by the presence of support surface 140.

Base plate 10, light source substrate 20, reflection sheet 30, and flatter 40 are joined to each other to form one structure body in the foregoing manner by the use of support member 100. Provided thereafter are various types of optical sheets 50 on the front side of the structure body (the side toward display panel 70), and display panel 70 on the front side of optical sheets 50 to constitute video display device 1 as illustrated in FIG. 2. According to video display device 1, display panel 70 is illuminated from the rear side with more uniform light emitted from light sources 21 of light source substrate 20 and passing through flatter 40 and the plurality of optical sheets 50. In this case, brightness of the light illuminating display panel 70 from the rear side is controlled (dimmed) for each area 71 in accordance with images. Accordingly, images having more accurate contrast are displayed on display panel 70.

As illustrated in FIG. 10, end 150 of support member 100 on the front side (the side toward display panel 70, plus side in Z axis direction in FIG. 7) is a portion regulating approach of optical sheet 50 to light source 21 in excess of second predetermined clearance D2. Accordingly, support member 100 is capable of easily maintaining the distance between optical sheet 50 and light source 21 at a length not shorter than second predetermined clearance D2 by the presence of end 150.

Through hole 11 of base plate 10 is hereinafter described.

Figure 11:
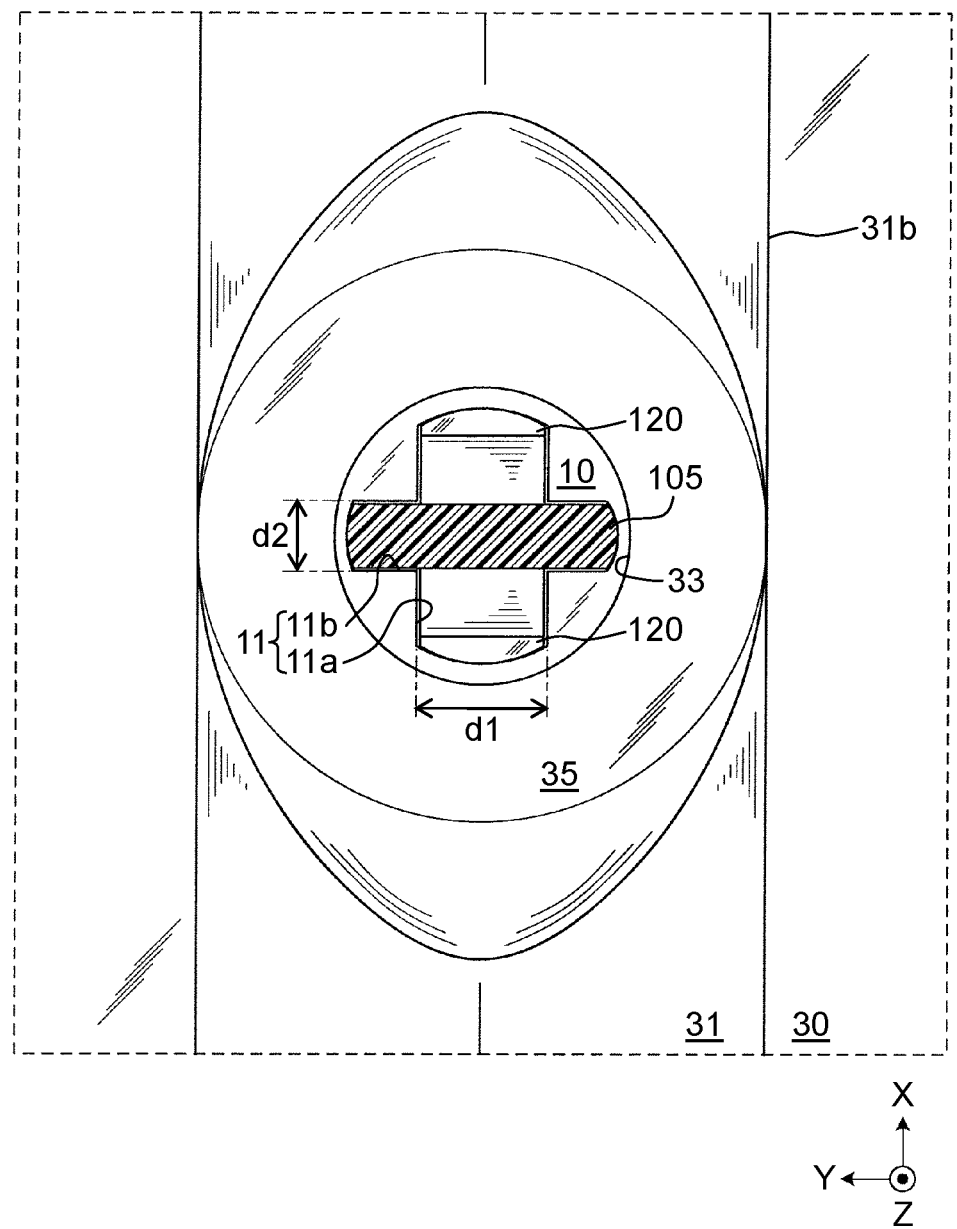
FIG. 11 is a plan view schematically illustrating an attachment example of the support member to the base plate included in the video display device according to the first exemplary embodiment.

FIG. 11 is a plan view schematically illustrating an attachment example of support member 100 attached to base plate 10 included in video display device 1 according to the first exemplary embodiment. FIG. 11 omits illustration of a part of support member 100 on the front side (the side toward display panel 70) of base plate 10 in an attachment state of support member 100 to base plate 10. FIG. 11 shows a cross section of base plate 10 of support member 100 in a part penetrating through hole 11 of base plate 10 of support member 100 (shaft portion 105).

As illustrated in FIG. 11, through hole 11 formed in base plate 10 has a cross shape formed by connecting first hole portion 11a and second hole portion 11b. First hole portion 11a has a substantially rectangular shape which has relatively large width d1 in a short direction (direction perpendicular to extension direction of linear portion 31b, Y axis direction in FIG. 11). Second hole portion 11b has a substantially rectangular shape which has width d2 in a short direction (extension direction of linear portion 31b, X axis direction in FIG. 11). Width d2 is smaller than width d1 of first hole portion 11a. Note that a width of first hole portion 11a in a long direction (extension direction of linear portion 31b, X axis direction in FIG. 11) is substantially equivalent to a width of second hole portion 11b in a long direction (direction perpendicular to extension direction of linear portion 31b, Y axis direction in FIG. 11).

Engaging portion 120 of support member 100 penetrates first hole 11a. In this case, engaging portion 120 engages with both end portions of first hole portion 11a in the long direction (X axis direction). First hole portion 11a has a shape corresponding to a shape of engaging portion 120 in a portion in contact with first hole portion 11a.

Shaft portion 105 of support member 100 penetrates second hole portion 11b. Second hole portion 11b has a shape corresponding to a shape of shaft portion 105 in a portion penetrating second hole portion 11b.

The long direction of first hole portion 11a is substantially identical to the extension direction of linear portion 31b of partitioning wall 31. On the other hand, a protrusion direction of wall portion 110 and a protrusion direction of engaging portion 120 are identical to each other as viewed from an extension direction of shaft portion 105 of support member 100 (Z axis direction in FIG. 7). Accordingly, in an attachment state of support member 100 to through hole 11, the protrusion direction of wall portion 110 and the extension direction of linear portion 31b of partitioning wall 31 are substantially identical to each other.

As illustrated in FIG. 4, through hole 12 is formed in base plate 10 on the boundary line of area 71 where linear portion 31b of partitioning wall 31 extends in the Y axis direction. The long direction of first hole portion 11a of through hole 12 corresponds to the Y axis direction. Accordingly, through hole 11 included in the plurality of through holes 11 and 12 of base plate 10, and provided at a position corresponding to linear portion 31b in parallel with the X axis direction has a shape of through hole 12 provided at a position corresponding to linear portion 31b in parallel with Y axis direction and rotated by an angle formed by the X axis direction and the Y axis direction (i.e., 90 degrees).

Note that through hole 11 is an example of a first through hole. Through hole 12 is an example of a second through hole.

As described above, through hole 11 (through hole 12) has a shape different from a shape of rotation symmetry except for line symmetry. In addition, the cross section of shaft portion 105 of support member 100 has a shape corresponding to the shape of through hole 11 (through hole 12). Accordingly, when support member 100 penetrates through hole 11 (or through hole 12), a posture of support member 100 can be fixed to a predetermined posture. In other words, insertion of shaft portion 105 of support member 100 into through hole 11 (or through hole 12) is not allowed when support member 100 does not have the predetermined posture at the time of attachment of support member 100 to through hole 11 (or through hole 12). Note that the predetermined posture in this context is a posture in which the protrusion direction of wall portion 110 becomes identical to the extension direction of linear portion 31b of partitioning wall 31. Accordingly, at the time of attachment of support member 100 to base plate 10 by an operator, the operator is capable of positioning support member 100 in an appropriate posture without the necessity of determining whether support member 100 is to be positioned on linear portion 31b in parallel with the X axis direction, or linear portion 31b in parallel with the Y axis direction. Accordingly, assembly efficiency by the operator at the time of manufacture of video display device 1 can improve.

According to this exemplary embodiment, each of through hole 11 and through hole 12 has a cross shape of two-fold symmetry. However, the foregoing effects are obtained as long as each of through hole 11 and through hole 12 has a shape different from a shape of rotation symmetry except for line symmetry. Accordingly, each of through hole 11 and through hole 12 is not limited to a cross shape, and may have a rectangular shape (example of two-fold symmetry), a trapezoidal shape (example of one-fold symmetry), and other shapes. Rotation symmetry except for line symmetry in this context refers to a shape of n-fold symmetry when n is 3 or larger.

[1-2. Effects and Others]

As described above, a video display device according to this exemplary embodiment includes: a display panel that displays an image based on an input image signal; a light source substrate that includes a plurality of light sources on a main surface which is a front side of the light source substrate, and emits light emitted from the plurality of light sources toward a rear side of the display panel; a reflection sheet that is provided on the main surface of the light source substrate, and includes hollow partitioning walls each of which separates adjacent two light sources of the plurality of light sources; an optical member that is provided between the display panel and the light source substrate, and uniformizes luminance distribution of the light emitted from the light source substrate; and support members each of which is provided between the light source substrate and the optical member, and supports the optical member. The reflection sheet includes intersection portions where the partitioning walls formed in a first direction and the partitioning walls formed in a second direction crossing the first direction cross each other, and further includes linear portions formed in parallel with the first direction or the second direction. Each of the support members is disposed in a recess portion formed in the corresponding linear portion.

Note that video display device 1 is an example of the video display device. Display panel 70 is an example of the display panel. Light sources 21 are an example of the light sources. Light source substrate 20 is an example of the light source substrate. Partitioning walls 31 are an example of the partitioning walls. Reflection sheet 30 is an example of the reflection sheet. Flatter 40 is an example of the optical member. Support members 100 are an example of the support members. Intersection portions 31a are an example of the intersection portions. Linear portions 31b are an example of the linear portions. Recess portions 35 are an example of the recess portions.

For example, according to the example presented in the first exemplary embodiment, video display device 1 includes: display panel 70 that displays an image based on an input image signal; light source substrate 20 that includes the plurality of light sources 21 on a main surface which is a front side of light source substrate 20, and emits light emitted from the plurality of light sources 21 toward a rear side of display panel 70; reflection sheet 30 that is provided on the main surface of light source substrate 20, and includes hollow partitioning walls 31 each of which separates adjacent two light sources of the plurality of light sources 21; flatter 40 that is provided between display panel 70 and light source substrate 20, and uniformizes luminance distribution of the light emitted from light source substrate 20; and support member 100 each of which is provided between light source substrate 20 and flatter 40, and supports flatter 40. Reflection sheet 30 includes intersection portions 31a where partitioning walls 31 formed in a first direction (such as X axis direction) and partitioning walls 31 formed in a second direction (such as Y axis direction) crossing the first direction cross each other, and further includes linear portions 31b formed in parallel with the first direction or the second direction. Each of support members 100 is disposed in a recess portion 35 formed in corresponding linear portion 31b of partitioning wall 31.

According to the video display device, the first direction and the second direction may be directions substantially perpendicular to each other. Each of the recess portions formed in the linear portion may be formed at a position in the partitioning wall disposed at least in either one of the first direction and the second direction with respect to the plurality of light sources.

According to the video display device, each of the support members may include a wall portion that has a shape corresponding to a shape of the recess portion of the partitioning wall.

Note that wall portion 110 is an example of the wall portion.

According to the video display device, a surface of each of the partitioning walls may be inclined in such a direction that a thickness of the partitioning wall decreases in a direction toward the front side (toward the display panel).

Note that inclined surface 31c is an example of the surface of the partitioning wall.

According to the video display device, each of the support members may include a shaft portion that extends in a front-rear direction of the video display device, an engaging portion formed at an end of the shaft portion on the rear side, and a plate portion that is disposed on the shaft portion with a predetermined clearance left between the plate portion and the engaging portion, and expands in a direction substantially perpendicular to the shaft portion. The shaft portion may further penetrate the light source substrate and the reflection sheet. Penetration portions formed in the light source substrate and the reflection sheet and penetrated by the shaft portion may be sandwiched between the engaging portion and the plate portion.

Note that shaft portion 105 is an example of the shaft portion. Engaging portion 120 is an example of the engaging portion. Plate portion 130 is an example of the plate portion.

The video display device may further include a support substrate that includes a plurality of through holes, the light source substrate disposed on the front side of the support substrate. Each of the plurality of through holes may have a shape different from a shape of rotation symmetry except for line symmetry. The shaft portion of each of the support members may further penetrate the corresponding through hole of the support substrate. A portion corresponding to each of the through holes in the support substrate may be sandwiched between the engaging portion and the plate portion. A cross section of a portion formed in the shaft portion and penetrating each of the through holes may have a shape corresponding to a shape of the corresponding through hole. A first through hole included in the plurality of through holes and provided at a position corresponding to the linear portion in parallel with the first direction may have a shape of a second through hole provided at a position corresponding to the linear portion in parallel with the second direction and rotated by an angle formed by the first direction and the second direction.

Note that the base plate is an example of the support substrate. Through hole 11 and through hole 12 are an example of the plurality of through holes. The shape of through hole 11 illustrated in FIG. 11 is an example of the shape different from a shape of rotation symmetry except for line symmetry. Through hole 11 is an example of the first through hole. Through hole 12 is an example of a second through hole. The angle of 90 degrees is an example of the angle formed by the first direction and the second direction.

According to the video display device, each of the support members may include a support surface that regulates approach of the optical member toward the light sources in excess of a first predetermined clearance.

Note that first predetermined clearance D1 is an example of the first predetermined clearance. Support surface 140 is an example of the support surface.

The video display device may further include an optical sheet disposed between the display panel and the optical member. An end of each of the support members on a side toward the display panel may regulate approach of the optical sheet toward the light sources in excess of a second predetermined clearance.

Note that optical sheets 50 are an example of the optical sheet. End 150 is an example of the end of the support member on a side toward the display panel. Second predetermined clearance D2 is an example of the second predetermined clearance.

According to video display device 1 having configuration described above, adjacent two light sources 21 are separated by partitioning wall 31 of reflection sheet 30. This configuration can prevent entrance of light emitted from different light source 21 corresponding to an adjoining area into an area corresponding to one light source 21.

In addition, each of support members 100 is disposed in recess portion 35 formed in linear portion 31b of corresponding partitioning wall 31 of reflection sheet 30. In this case, flatter 40 is supported via support member 100 provided on partitioning walls 31 and located at positions relatively close to light sources 21. Accordingly, the distance between light sources 21 and flatter 40 can be more easily maintained at first predetermined clearance D1 in comparison with such a case as to support flatter 40 via support member 100 located at positions relatively far from light sources 21. As a result, in video display device 1, luminance lowering or luminance non-uniformity of a backlight constituted by light source substrate 20 can be suppressed. Moreover, in the state that support member 100 is provided on linear portion 31b relatively close to light source 21 and thus relatively bright, luminance lowering caused by the presence of support member 100 can decrease in comparison with such a case as to provide support member 100 on intersection portion 31a relatively far from light source 21 and thus relatively dark.

In addition, support member 100 is disposed in recess portion 35 of partitioning wall 31. In this case, a shadow of support member 100 within area 71 of video display device 1 can decrease, wherefore it is possible to prevent support member 100 from causing luminance lowering within area 71.

In addition, recess portion 35 of linear portion 31b is formed in partitioning wall 31 disposed at least in the first direction (such as X axis direction) or the second direction (such as Y axis direction) with respect to the plurality of light sources 21. In other words, recess portion 35 is formed at least either in partitioning wall 31 in the first direction with respect to light sources 21, and in partitioning wall 31 in the second direction with respect to light sources 21. In this case, recess portion 35 provided in partitioning wall 31 is located at the closest position to light sources 21, wherefore support member 100 provided on linear portion 31b of partitioning wall 31 of reflection sheet 30 is located at the closest position to light sources 21. Accordingly, the distance between light sources 21 and flatter 40 can be effectively maintained at first predetermined clearance D1 in comparison with such a case as to support flatter 40 via support member 100 located at a position relatively far from light sources 21. As a result, in video display device 1, luminance lowering or luminance non-uniformity of the backlight constituted by light source substrate 20 can be suppressed.

In addition, support member 100 includes wall portion 110 that has a shape corresponding to a shape of recess portion 35 of partitioning wall 31. In this case, support member 100 can suppress mutual entrance of light emitted from light sources 21 disposed in the respective areas into the other areas via recess portion 35. As a result, video display device 1 can effectively suppress luminance lowering or luminance non-uniformity of the backlight constituted by light source substrate 20.

In addition, according to video display device 1, hollow partitioning walls 31 each of which separates adjacent two light sources 21 are formed on reflection sheet 30. Driver elements 22 and driver elements 23 are stored within partitioning walls 31. In this case, luminance non-uniformity of the backlight caused by interference between driver elements 22 and 23 and reflection sheet 30 can be prevented from occurring. Accordingly, driver elements 22 and driver elements 23 of video display device 1 are mountable on light source substrate 20 by effectively utilizing spaces inside partitioning walls 31. In addition, according to video display device 1, partitioning walls 31 reduce mutual light leakage between areas 71 illuminated by adjacent ones of light emitting elements 21. In this case, accuracy of brightness produced by light sources 21 in respective areas 71 further improves, wherefore luminance of light illuminating display panel 70 becomes more accurate. Accordingly, video display device 1 further improves contrast achieved by local dimming.

Other Exemplary Embodiments

Discussed in the first exemplary embodiment is a configuration example which includes wall portion 110 of support member 100 to constitute a portion protruding in the extension direction of partitioning wall 31 (extension direction of linear portion 31b) (see FIG. 7). However, a shape of a support member provided according to the present disclosure is not limited to the shape illustrated in FIG. 7. Another shape example of the support member is hereinafter described. The support member may have a shape illustrated in FIG. 12, for example.

Figure 12:
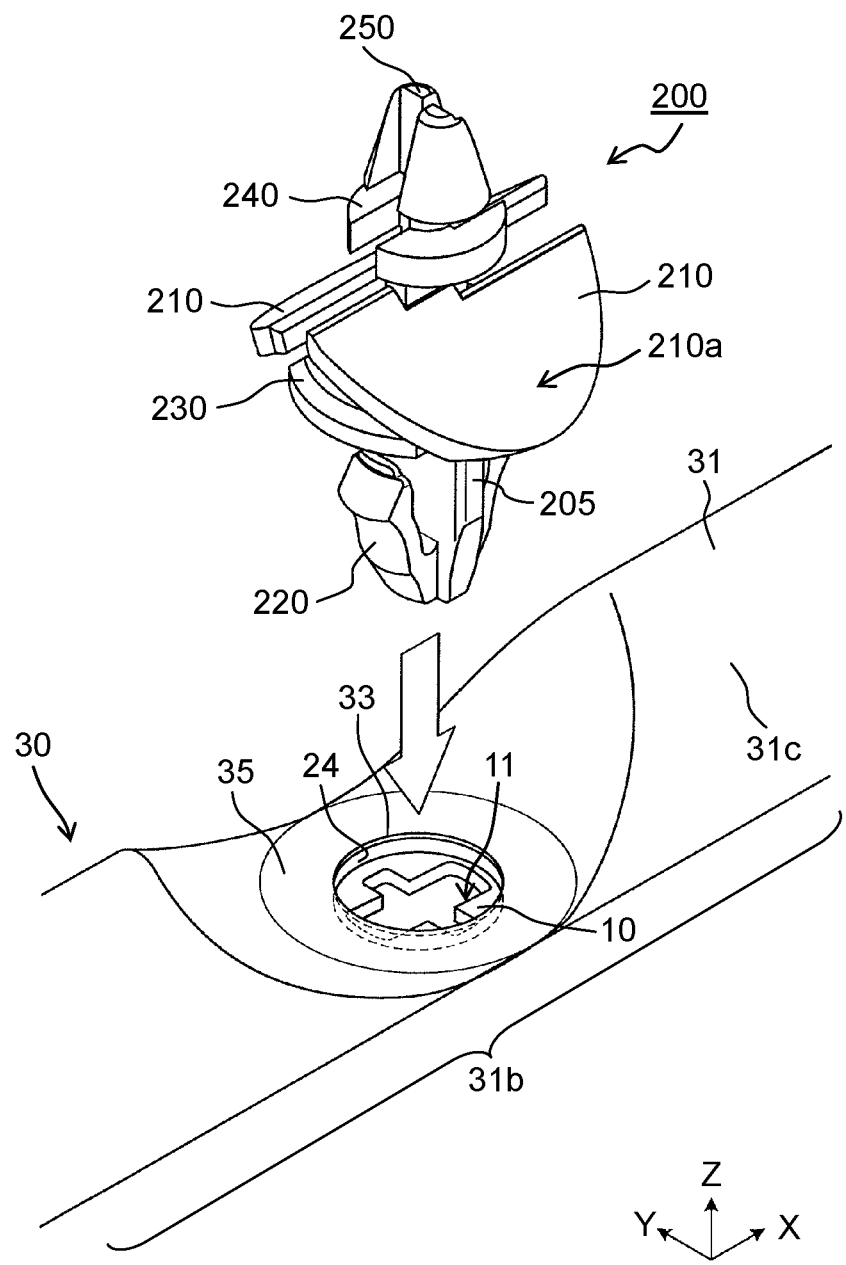
FIG. 12 is a perspective view schematically illustrating an example of a shape of a support member included in a video display device according to another exemplary embodiment.

FIG. 12 is a perspective view schematically illustrating an example of a shape of support member 200 included in a video display device according to another exemplary embodiment. Note that the video display device described herein has a configuration substantially similar to the configuration of video display device 1 described above, except in that the shape of support member 200 is different from the shape of support member 100 described above. Accordingly, description about a configuration substantially similar to the configuration of video display device 1 described above is not repeated, and the shape of support member 200 is described. In addition, support member 200 includes engaging portion 220, plate portion 230, support surface 240, and end 250, which have functions substantially similar to functions of engaging portion 120, plate portion 130, support surface 140, and end 150, respectively, of support member 100 described above. Accordingly, these portions are not detailed herein. Moreover, a material constituting support member 200 is substantially similar to a material constituting support member 100.

As illustrated in FIG. 12, support member 200 includes two wall portions 210. Two wall portions 210 are provided on shaft portion 205 on both outside portions with respect to the direction perpendicular to the extension direction of linear portion 31b (Y axis direction in FIG. 12), and shaped to expand in the extension direction of linear portion 31b (X axis direction in FIG. 12) from these portions in an attachment state of support member 200 to base plate 10. Each of two wall portions 210 includes inclined surface 210a disposed on an extension line of the surface of partitioning wall 31 (i.e., inclined surface 31c). In other words, each of inclined surfaces 210a of two wall portions 210 has a shape constituting the extension line of corresponding one of two inclined surfaces 31c included in partitioning wall 31.

Accordingly, each of the wall portions of the support members in the video display device may include an inclined surface disposed on an extension line of a surface of the partitioning wall.

Note that support members 200 are an example of the support members. Wall portions 210 are an example of the wall portions. Inclined surfaces 31c are an example of the surfaces of the partitioning walls. Inclined surfaces 210a are an example of the inclined surfaces of the wall portions of the support members.

According to this configuration, light emitted from light sources 21 toward support members 200 can be reflected on inclined surfaces 210a of wall portions 210 toward display panel 70, similarly to reflection on partitioning walls 31 of reflection sheet 30. Accordingly, the video display device can effectively suppress luminance lowering or luminance non-uniformity of the backlight constituted by light source substrate 20.

Note that shaft portion 205 in a portion on the front side (the side toward display panel 70, plus side in Z axis direction in FIG. 12) with respect to plate portion 230 may be divided into two parts in the direction perpendicular to the extension direction of linear portion 31b (Y axis direction in FIG. 12) as illustrated in FIG. 12.

The first and other exemplary embodiments have been described by way of example of the technology disclosed according to the present application. The accompanying drawings and detailed description have been presented for this purpose.

Accordingly, for presentation of examples of the technology, constituent elements shown in the accompanying drawings and detailed description may contain not only constituent elements essential for solving problems, but also constituent elements not essential for solving problems. It should not be therefore directly determined that the constituent elements which are not essential elements are essential based on the consideration that these constituent elements are included in the accompanying drawings and detailed description.

Moreover, the exemplary embodiments described above are presented as examples of the technology of the present disclosure, wherefore various modifications, replacements, additions, omissions and the like may be made within the scope of the claims and an equivalent range. In addition, a different exemplary embodiment may be produced by combining respective constituent elements described in the first and other exemplary embodiments.

Note that errors and variations in positions, shapes and the like of respective members included in the foregoing description are allowed as long as intended advantageous effects are offered. In addition, a phrase "uniformize luminance distribution" included in the above description and the appended claims does not only refer to uniformization of distribution in a strict sense. Errors and variations may be allowed as long as intended advantageous effects are offered. Improvement of uniformity of luminance distribution is also included in this phrase.

INDUSTRIAL APPLICABILITY

The present disclosure is applicable to a video display device. More specifically, the present disclosure is applicable to a television receiver, an image recording and reproducing device, a computer display device, and others.

REFERENCE MARKS IN THE DRAWINGS

1: video display device
1a: housing
10: base plate
11, 12: through hole
11a: first hole portion
11b: second hole portion
20: light source substrate
21: light source
22, 23: driver element
24: opening
25: screw hole
30: reflection sheet
31: partitioning wall
31a: intersection portion
31b: linear portion
31c: inclined surface
32, 33: opening
35: recess portion
36: adhesive tape
40: flatter
41, 41a: hole
50: optical sheet
60: mold frame
70: display panel
71: area
80: bezel
91: connection terminal substrate
92: signal processing substrate
93: power supply substrate
100, 200: support member
105, 205: shaft portion
110, 210: wall portion
120, 220: engaging portion
130, 230: plate portion
140, 240: support surface 150, 250: end
210a: inclined surface
D1: first predetermined clearance
D2: second predetermined clearance
d1, d2: width

The invention claimed is:

1. A video display device comprising:
a display panel that displays an image based on an input image signal;
a light source substrate that includes a plurality of light sources on a main surface which is a front side of the light source substrate, and emits, toward a rear side of the display panel, light emitted from the plurality of light sources;
a reflection sheet that is provided on the main surface of the light source substrate, and in which hollow partitioning walls each of which separates adjacent two light sources of the plurality of light sources are formed;
an optical member that is provided between the display panel and the light source substrate, and uniformizes luminance distribution of the light emitted from the light source substrate; and
support members each of which is provided between the light source substrate and the optical member, and supports the optical member,
wherein
the reflection sheet includes:
intersection portions where the partitioning walls formed in a first direction and the partitioning walls formed in a second direction crossing the first direction cross each other, and
linear portions formed in parallel with the first direction or the second direction, and
each of the support members is disposed in a recess portion formed in a corresponding linear portion, and
wherein the light source substrate includes a plurality of light source substrates, and the reflection sheet is a one piece reflection sheet, the one piece reflection sheet having flat portions disposed on the plurality of light source substrates.

2. The video display device according to claim 1, wherein the first direction and the second direction are directions substantially perpendicular to each other, and
each of the recess portions formed in the linear portions is formed at a position in the partitioning wall disposed at least in either one of the first direction and the second direction with respect to the plurality of light sources.

3. The video display device according to claim 1, wherein each of the support members includes a wall portion that has a shape corresponding to a shape of the recess portion of the partitioning wall.

4. The video display device according to claim 3, wherein a surface of each of the partitioning walls is inclined in such a direction that a thickness of the partitioning wall decreases in a direction toward the front side, and
each of the wall portions includes an inclined surface disposed on an extension line of a surface of the partitioning wall.

5. The video display device according to claim 1, wherein each of the support members includes
a shaft portion that extends in a front-rear direction of the video display device,
an engaging portion formed at an end of the shaft portion on the rear side, and
a plate portion that is provided on the shaft portion with a predetermined clearance left between the plate portion and the engaging portion, and expands in a direction substantially perpendicular to the shaft portion,
the shaft portion penetrates the light source substrate and the reflection sheet, and
penetration portions formed in the light source substrate and the reflection sheet and penetrated by the shaft portion are sandwiched between the engaging portion and the plate portion.

6. The video display device according to claim 5, further comprising
a support substrate in which a plurality of through holes are formed, the light source substrate being disposed on the front side of the support substrate,
wherein
each of the plurality of through holes has a shape different from a shape of rotation symmetry except for line symmetry,
the shaft portion of each of the support members further penetrates a corresponding through hole of the support substrate,
a portion corresponding to each of the through holes in the support substrate is sandwiched between the engaging portion and the plate portion,
a cross section of a portion formed in the shaft portion and penetrating each of the through holes has a shape corresponding to a shape of the corresponding through hole, and
a first through hole included in the plurality of through holes and provided at a position corresponding to the linear portion that is parallel with the first direction has a shape of a second through hole provided at a position corresponding to the linear portion that is parallel with the second direction and rotated by an angle formed by the first direction and the second direction.

7. The video display device according to claim 1, wherein each of the support members includes a support surface that regulates approach of the optical member toward the light sources in excess of a first predetermined clearance.

8. The video display device according to claim 1, further comprising
an optical sheet disposed between the display panel and the optical member,
wherein
an end of each of the support members on a side toward the display panel regulates approach of the optical sheet toward the light sources in excess of a second predetermined clearance.

* * * * *